(12) United States Patent
Gölz et al.

(10) Patent No.: US 9,909,524 B2
(45) Date of Patent: Mar. 6, 2018

(54) METHOD FOR OPERATING AN INTERNAL COMBUSTION ENGINE AND DEVICE FOR THE OPENLOOP AND CLOSED-LOOP CONTROL OF AN INTERNAL COMBUSTION ENGINE, INJECTION SYSTEM, AND INTERNAL COMBUSTION ENGINE

(71) Applicant: MTU Friedrichshafen GmbH, Friedrichshafen (DE)

(72) Inventors: Markus Gölz, Ravensburg (DE); Robby Gerbeth, Friedrichshafen (DE); Frank Mlicki, Radolfzell (DE); Michael Walder, Ravensburg (DE); Carsten Engler, Wolfegg (DE); Andreas Mehr, Kressbronn (DE); Christian Wolf, Langenargen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 15/028,565

(22) PCT Filed: Aug. 21, 2014

(86) PCT No.: PCT/EP2014/002296
§ 371 (c)(1),
(2) Date: Apr. 11, 2016

(87) PCT Pub. No.: WO2015/051865
PCT Pub. Date: Apr. 16, 2015

(65) Prior Publication Data
US 2016/0298570 A1    Oct. 13, 2016

(30) Foreign Application Priority Data
Oct. 11, 2013 (DE) .......... 10 2013 220 589

(51) Int. Cl.
*F02D 41/40* (2006.01)
*F02D 41/38* (2006.01)

(52) U.S. Cl.
CPC ....... *F02D 41/402* (2013.01); *F02D 41/3809* (2013.01); *F02D 2200/0602* (2013.01); *F02D 2250/04* (2013.01); *Y02T 10/44* (2013.01)

(58) Field of Classification Search
CPC .............. F02D 41/402; F02D 41/3809; F02D 2200/0602; F02D 2250/04; Y02T 10/44
(Continued)

(56) References Cited

U.S. PATENT DOCUMENTS 7,272,486 B2    9/2007 Speetzen et al.
7,769,530 B2    8/2010 Hehle et al.
(Continued)

FOREIGN PATENT DOCUMENTS

DE    19935519 C2    5/2001
DE    10344181 A1    4/2005
(Continued)

*Primary Examiner* — John Kwon
*Assistant Examiner* — Johnny H Hoang
(74) *Attorney, Agent, or Firm* — Lucas & Mercanti, LLP; Klaus P. Stoffel

(57) ABSTRACT

A method for operating an internal combustion engine having a motor with cylinder and an injection system having a common rail and injectors for the cylinders. Each injector has an accumulator for holding fuel from the common rail. A multiple injection of fuel is performed during each working cycle of a cylinder, including injecting a first amount in a first injection and injecting a second amount in a second injection, and determining fuel pressure for the common rail and/or the accumulator. A fuel injection amount parameter is determined for the first injection; an individual accumulator pressure and/or a common rail pressure is determined for the second injection; and a fuel injection amount parameter is determined for the second injection. The individual accu- (Continued)

mulator pressure and/or the common rail pressure are/is considered for determining the injection amount parameter of the fuel for the second injection.

16 Claims, 10 Drawing Sheets

(58) Field of Classification Search
USPC .................. 123/299, 300, 305; 701/103, 104
See application file for complete search history.

(56) References Cited

U.S. PATENT DOCUMENTS

| | | | |
|---|---|---|---|
| 7,788,018 B2 | 8/2010 | Speetzen et al. | |
| 8,527,181 B2 | 9/2013 | Walder et al. | |
| 2003/0089334 A1* | 5/2003 | Yomogida | F02D 41/3836 123/300 |
| 2005/0188947 A1* | 9/2005 | Shirakawa | F02D 41/403 123/299 |
| 2008/0060617 A1* | 3/2008 | Adachi | F02D 31/007 123/447 |
| 2008/0228374 A1 | 9/2008 | Ishizuka et al. | |
| 2009/0164094 A1* | 6/2009 | Geveci | F02D 41/0087 701/103 |
| 2009/0182487 A1* | 7/2009 | Halleberg | F02D 41/1497 701/106 |
| 2010/0280743 A1 | 11/2010 | Hehle et al. | |
| 2011/0000465 A1 | 1/2011 | Stoecklein et al. | |
| 2011/0162628 A1* | 7/2011 | Kurtz | F02D 41/005 123/672 |
| 2011/0313639 A1* | 12/2011 | Hemmerlein | F02M 63/0225 701/103 |
| 2012/0143477 A1* | 6/2012 | Ruona | F02D 35/024 701/103 |
| 2013/0261930 A1* | 10/2013 | Kurtz | F02D 21/08 701/102 |
| 2014/0224220 A1* | 8/2014 | Moonjelly | F02D 1/06 123/447 |
| 2014/0251275 A1* | 9/2014 | Lana | F02M 63/0225 123/452 |
| 2015/0233318 A1* | 8/2015 | Nieddu | F02D 41/123 701/104 |

FOREIGN PATENT DOCUMENTS

| | | |
|---|---|---|
| DE | 102005036190 A1 | 2/2007 |
| DE | 102006043326 A1 | 3/2008 |
| DE | 102007037037 B3 | 2/2009 |
| DE | 102007045606 B3 | 2/2009 |
| DE | 102009002793 A1 | 11/2010 |
| DE | 102009056381 A1 | 6/2011 |

* cited by examiner

METHOD FOR OPERATING AN INTERNAL COMBUSTION ENGINE AND DEVICE FOR THE OPENLOOP AND CLOSED-LOOP CONTROL OF AN INTERNAL COMBUSTION ENGINE, INJECTION SYSTEM, AND INTERNAL COMBUSTION ENGINE

The present application is a 371 of International application PCT/EP2014/002296, filed Aug. 21, 2014, which claims priority of DE 10 2013 220 589.9, filed Oct. 11, 2013, the priority of these applications is hereby claimed and these applications are incorporated herein by reference.

BACKGROUND OF THE INVENTION

The invention relates to a method for operating an internal combustion engine. The invention also relates to a device for the control and/or regulation of an internal combustion engine having a motor regulator and an injection processor module which are designed for carrying out the method. The invention also relates to an injection system having a motor, which has a common rail for an internal combustion engine with a number of cylinders, and having a number of injectors assigned to the cylinders, wherein an injector is assigned an individual accumulator which is designed for holding fuel from the common rail available for injection into the cylinder. The invention also relates to an internal combustion engine having a motor, which has a number of cylinders, and having an injection system with a common rail and with a number of injectors, wherein an injector is assigned an individual accumulator which is designed for holding fuel from the common rail available for injection into the cylinder.

In an internal combustion engine, the start of injection and the end of injection are significant in determining the quality of the combustion and the composition of the exhaust gas. To comply with legal limit values, these two characteristic variables are commonly regulated by an electronic control unit, which may be a separate module for injection control and/or regulation or may be a part of an engine regulator (ECU). In this way, it is possible, depending on demand, to specify an injection quantity parameter, such as for example the injection quantity of the fuel itself or some other suitable injection quantity parameter which is significant for the injection quantity, that is to say from which the injection quantity of the fuel can be inferred, in particular from which the injection quantity of the fuel can be calculated, reliably assumed, estimated or reliably determined in some other way. If appropriate, it is possible for the injection quantity parameter itself rather than the injection quantity of the fuel to be taken into consideration for further measures. An appropriate injection quantity parameter of said type may in particular be an injection duration of the injector and/or an energization duration of an injector. As significant parameters for this purpose, use may be made of the start of injection, an end of injection, or a start of energization for an injector, an end of energization for an injector, or any desired combination of these and other injection quantity parameters. On the basis of such determinations, which are directed in particular to the injection duration or similar injection quantity parameter or the injection quantity itself, it is possible as a result to make a statement regarding the fuel quantity actually used for working cycle of a cylinder. This is compatible with engine running and the compliance with emissions regulations and is important not only in steady-state running but increasingly also for transient running during engine operation.

The concept of an injector with an individual accumulator has been proven in the context of a common-rail injection system as described for example in DE 199 35 519 C2. The individual accumulator is supplied with pressurized fuel from the pressure port via a fuel inflow duct and is directly connected in terms of flow to the high-pressure duct for the highly pressurized fuel in the common rail. The volume of the individual accumulator is large compared with the volume of the high-pressure duct and of the nozzle prechamber in the injector. Owing to the arrangement of the injector—if appropriate decoupled from the common rail by way of a throttle element—there is adequate space available in the individual accumulator in the housing of the fuel injector for holding fuel available for at least one entire injection quantity for a working cycle of a cylinder, or at any rate for a partial injection during the course of the working cycle.

A method for the regulation of an internal combustion engine having a common-rail system together with individual accumulators is known from DE 10 2007 037 037 B3, in which an injection duration for the actuation of the injectors is calculated; this is performed on the basis of rotational speed regulation of an outer regulation loop and injection duration regulation of an inner regulation loop.

DE 103 44 181 A1 describes an internal combustion engine having a common-rail system including individual accumulators, approximately as is schematically shown in FIG. 1. The fuel pressure of the individual accumulators is detected during a measurement interval and stored. On the basis of the stored pressure values, an end of injection is determined, and a virtual start of injection is calculated.

DE 10 2009 002 793 A1 describes a method in which, for a multiple injection, the pressure of a high-pressure source and the pressure of an individual accumulator are used.

To better satisfy the requirements mentioned in the introduction, a multiple injection has proven to be particularly advantageous. It is common in the case of multiple injections—that is to say in particular with a main injection (HE) and a pre-injection (VE) and/or a post-injection (NE)—to assume that system pressure prevails for an injection, and in particular to assume that system pressure prevails also for a subsequent injection, that is to say that the system at the injector is acted on with a pressure of the common rail. While this is basically correct, it has nevertheless likewise proven relevant, for multiple injections in the case of a common-rail system including individual accumulator and injector of the type discussed in the introduction, for the pressure of the common rail to be assumed to be the system pressure actually relevant for the injection quantity throughout; that is to say both for a main injection and for a secondary injection. In the case of an injection system in the form of a common-rail system with individual accumulator and injector, it is desirable to control a fuel quantity during a multiple injection in an improved manner, in particular to determine an injection quantity for a subsequent injection in a particularly reliable manner and/or in an improved manner.

SUMMARY OF THE INVENTION

It is this that is addressed by the invention, the object of which is to specify a method and an apparatus—in particular a device for control and/or regulation and an injection system and also an internal combustion engine—in the case of which, in general, the fuel quantity is controlled in an improved manner during a multiple injection. In particular, the fuel quantity introduced during the course of a subsequent injection, that is to say the injection quantity, during a multiple injection should be controlled in an improved manner.

The object relating to the method is achieved by the invention based on an injection system with common rail, with an individual accumulator and with an injector. The invention proceeds from a method in which fuel is injected by way of an injector into a cylinder, wherein a multiple injection is performed during each working cycle of a cylinder, having the steps:

injecting a first injection quantity of fuel in a first, preceding injection and injecting a second injection quantity of fuel in a second, subsequent injection, and
determining a fuel pressure for the common rail and the individual accumulator.

According to the invention, in the method, the following steps are provided:

an injection quantity parameter of the fuel for the first, preceding injection is determined;
an individual-accumulator pressure and/or a common rail pressure for the second, subsequent injection is determined; and
an injection quantity parameter of the fuel for the second, subsequent injection is determined. According to the invention, the individual-accumulator pressure and/or the common rail pressure is selectively taken into consideration in order to determine the injection quantity parameter of the fuel for the second, subsequent injection.

Basically, an injection quantity parameter of the fuel in the context mentioned in the introduction is to be understood to mean any parameter for the control of the injection system which is suitable for influencing, in particular significantly describing, an injection quantity of fuel introduced into a cylinder chamber during the working cycle of the cylinder; an injection quantity parameter is preferably a measure for the injection quantity. The determination of the injection quantity parameter may thus comprise the determination of the injection quantity itself and/or a control variable relevant for the injection quantity. In particular, an injection quantity parameter—in particular for a first and/or a second injection—may be understood to mean an injection quantity itself, in particular a total injection quantity, first injection quantity and/or second injection quantity; in particular, this applies to an injection quantity parameter of the first injection, and if appropriate also the second injection.

An injection quantity parameter may additionally or alternatively also be understood to mean a control variable such as an injection duration, a start of injection, an end of injection for an injection and/or an energization duration, a start of energization, an end of energization for an injector or similar parameter in particular for a first and/or a second injection, preferably a second injection
and any desired combination thereof. In particular, a control variable may be specified in a manner dependent on the injection quantity itself, in particular a setpoint injection quantity.

An injection quantity parameter may comprise a characteristic map, in particular may be specified by way of a characteristic map. In particular, a number of characteristic maps may be provided which specify an injection quantity parameter, preferably an energization duration and/or a start of energization of an injector, preferably in a manner dependent on a pressure value and/or a (setpoint) injection quantity (for example for the determination of an energization duration) or in a manner dependent on an engine speed and/or an engine torque (for example for the determination of a start of energization).

It is preferably possible for a first characteristic map to be provided for specifying an energization duration of an injector, which preferably specifies the energization duration in a manner dependent at least on the common-rail pressure, preferably additionally in a manner dependent on a (setpoint) injection quantity. It is preferably possible, in addition to the first characteristic map, for a further first characteristic map to be provided for specifying an energization duration correction of an injector, which further first characteristic map specifies the energization duration correction preferably in a manner dependent at least on an individual-accumulator pressure, preferably additionally in a manner dependent on a (setpoint) injection quantity.

It is preferably possible for a second characteristic map to be provided for specifying a start of energization of an injector, which preferably specifies the start of energization in a manner dependent at least on the engine speed, preferably additionally in a manner dependent on an engine torque. It is preferably possible, in addition to the first characteristic map, for a further second characteristic map to be provided for specifying a start of energization correction of an injector, which further second characteristic map specifies the start of energization correction preferably in a manner dependent at least on an individual-accumulator pressure, preferably additionally in a manner dependent on a (setpoint) injection quantity.

A "determination" of a value such as an injection quantity parameter refers in particular to a measurement, calculation, extrapolation, simulation, read-out from a characteristic map or similar establishment of a value. It may also refer to the predefinition of a value for example as a setpoint value or actual value from a controller and/or regulator. It may also refer to the predefinition of a value, for example the injection quantity itself, by setting of a control variable such as an energization duration and/or a start of energization.

The invention is based on the consideration that, for situations in which the pressure of a subsequent injection at the injector is set as system pressure (that is to say as the pressure of the common rail), then it may be the case, in a manner to be corrected, that an excessively low injection quantity during subsequent injection is assumed. The actual pressure in the individual accumulator is, by contrast, relevant, which need not necessarily correspond to the pressure of the common rail.

The invention has recognized that a determination of an injection quantity parameter for the subsequent injection must take into consideration the pressure prevailing in the individual accumulator in the presence of a post-injection, and provides according to the invention that, for the determination of the injection quantity parameter of the fuel for the second, subsequent injection, the individual-accumulator pressure and/or the common-rail pressure is selectively used. It is thus possible to select whether the individual-accumulator pressure and/or the common-rail pressure is taken into consideration, in particular in a manner dependent on the state of a system parameter.

In particular, in the context of one refinement, it has proven advantageous to take into consideration a pressure lower than the common-rail pressure for the determination of the injection quantity parameter of the fuel for the second, subsequent injection. In this refinement, it is assumed that, as a result of extraction of fuel from the common rail for the subsequent injection, pressure prevailing in the individual accumulator generally lies below the common-rail pressure.

The concept of the invention preferably leads to an injection quantity parameter of the fuel for the second, subsequent injection being determined taking into consideration a corrected injection pressure, specifically the individual-accumulator pressure. In particular, a desired injection quantity in the case of a subsequent injection can be implemented such that, basically, an actually desired total fuel quantity is introduced into the cylinder per working cycle in a multiple injection. Altogether, the concept of the invention has the advantage that a desired fuel quantity is ensured in a multiple injection, in particular is ensured in the context of a subsequent injection. The concept of the invention makes it possible for the desired injection quantity in the subsequent injection to be implemented in an adjustable manner in a manner dependent on the actually prevailing individual-accumulator pressure and/or common-rail pressure. An introduction of a desired total fuel quantity in a multiple injection is thus ensured, specifically independently of an injection quantity during a preceding injection.

In the context of the stated problem, the invention &so provides a device and an injection system and an internal combustion engine.

The concept preferably offers the basis for improved engine running, in particular a more stable engine running. In particular, pressure gradients with respect to time in the cylinder are smoothed, such that, for example, noise emissions and/or powertrain loading are reduced. Also, compliance with emissions guidelines is possible in an improved manner, in particular also independently of an internal combustion engine operating point to be operated at. It is also possible for exhaust-gas emissions to be complied with from the new state and throughout the service life of an injector by way of correction of a pre-injection and post-injection of an injector. The concept furthermore offers the basis for relatively flexible motor parameterization. Altogether, the concept leads, on this basis, to an improved specification, in particular correct calculation, of an engine torque and exhaust-gas mass flow. The advantages of the concept not only come to bear in the injection profile itself but furthermore also lead, by way of more flexible engine parameterization, to altogether improved operation of the internal combustion engine.

The concept permits in particular an improvement of an injector with individual accumulators (preferably with and without individual-accumulator pressure sensor arrangement) for controlled engine operation with multiple injection. In one refinement, a learning methodology is provided (preferably with and if appropriate also without individual-accumulator pressure sensor arrangement).

These and other advantageous refinements of the invention emerge from the subclaims and specify, in detail, advantageous possibilities for realizing the above-discussed concept in the context of the stated problem and with regard to further advantages.

It is preferable for an injection quantity parameter, in particular the injection quantity itself, of the fuel for the first, preceding injection to be determined; preferably not necessarily with adaptation of an energization duration and/or of a start of energization of the injector—that is to say for example advantageously by predefinition of a standard value of an energization duration and/or of a start of energization of the injector.

It is preferable for an injection quantity parameter, in particular the injection quantity itself, of the fuel for the second, subsequent injection to be determined, with adaptation of an energization duration and/or of a start of energization of the injector. The energization duration and/or the start of energization of the injector have proven to be preferred control and regulation parameters in the context of injection regulation and/or engine regulation. In particular, it is possible to utilize a method for rapid and cylinder-specific determination of an actual start of injection and end of injection from the energization times, as used in DE 103 44 181 A1, the content of disclosure of which is hereby incorporated into the present application by citation. In particular, in the present case, the injection quantity for the second, subsequent injection can be adapted with specification of a corrective value of a predefined standard value of an energization duration and/or of a start of energization of the injector for the second, subsequent injection.

In the context of a preferred refinement, an injection quantity parameter of the fuel, in particular an injection quantity itself, for the second, subsequent injection is determined; preferably in a manner dependent on a threshold value. The threshold value is preferably formed in order to indicate an adaptation-relevant threshold deviation of the individual-accumulator pressure from the common-rail pressure. An individual-accumulator pressure and/or a common-rail pressure may preferably be measured by way of a pressure sensor, such as for example a strain gauge or the like on the individual accumulator and/or common rail. A threshold deviation of the individual-accumulator pressure from the common-rail pressure may preferably be specified as a difference threshold value between an individual-accumulator pressure and a common-rail pressure.

A particularly preferred refinement provides that, for the determination of the injection quantity of the fuel for the second, subsequent injection, the common-rail pressure is taken into consideration if the magnitude of the difference between the common-rail pressure and individual-accumulator pressure lies below the threshold value, or the individual-accumulator pressure rather than the common-rail pressure is taken into consideration if the magnitude of a difference between common-rail pressure and individual-accumulator pressure lies above the threshold value.

In the context of a particularly preferred refining variant of the method, it has proven to be advantageous if, additionally or alternatively to the pressure measurement as described above, a pressure relevant for a subsequent injection, that is to say individual-accumulator pressure, is determined mathematically, in particular analytically and/or by extrapolation or interpolation of characteristic maps.

It is particularly preferably possible, in the context of the variant mentioned above, to infer an individual-accumulator pressure for the second, subsequent injection in a manner dependent on an injection quantity parameter of the preceding injection and/or in a manner dependent on an interval between the preceding injection and subsequent injection. Following this refining basic approach, it has proven to be particularly advantageous that, in the context of the refinement, the method is characterized by the further steps:

determining an injection interval between the first injection and the second injection, determining an individual-accumulator pressure in order to determine the injection quantity parameter of the fuel for the second, subsequent injection.

This is preferably performed at least in a manner dependent on the injection quantity parameter of the fuel for the first, preceding injection and the injection interval. For example, it is preferably possible for the injection interval to be determined from an injection end (SE) of the first, preceding injection and a start of injection (SB) of the second, subsequent injection.

The refinement as per the variant has identified that the actual pressure in the individual accumulator for the subsequent injection is significantly dependent on the injection quantity or an injection quantity parameter assigned thereto; this is because it has been identified that the injection quantity of the preceding injection basically leads to a drop in the common-rail pressure, that is to say a drop in pressure in the common rail, which is also manifested in the individual-accumulator pressure. Thus, an individual-accumulator pressure prevails which basically, after the preceding injection, lies below the common-rail pressure assumed as being a relatively steady state.

In the context of the refining variant, it has also been identified that the length of an injection interval is significant for a renewed increase of the individual-accumulator pressure. A renewed increase may take place in particular from a lower value, arising as a result of the abovementioned drop in pressure, to an upper value of an individual-accumulator pressure which prevails at the end of the injection interval, that is to say a value such as is actually relevant for a subsequent injection. The variant particularly preferably provides that at least one of the parameters "injection quantity parameter of the fuel for the first, preceding injection" or "injection interval", but preferably both in combination, are used for determining the injection quantity parameter, in particular the injection quantity, for the second, subsequent injection.

The actual pressure prevailing for the subsequent injection, in particular individual-accumulator pressure, is particularly advantageously determined analytically or interpolation from one or more characteristic maps in a manner dependent on the preceding injection quantity and the injection interval between preceding injection and subsequent injection.

In the context of a particularly preferred embodiment of the preferred refinement, it may be provided—as is described in detail by way of an example on the basis of the drawing—that, for a first injection, a common-rail pressure (signal) is sufficient in order to read out a start of energization and/or an energization duration for an injector for the first injection from at least one characteristic map, preferably from a standard characteristic map, preferably from an associated first and second characteristic map; in other words, in the case of a first, preceding injection, it can be assumed that the individual accumulator pressure approximately corresponds to the rail pressure.

In the context of the particular embodiment of the preferred refinement, it is possible—as described in detail by way of an example on the basis of the drawing—that, for a second injection, a pressure drop and a refilling of the individual accumulator is triggered as a result of the first, preceding injection. In a manner dependent on the injected fuel quantity (for example volume or, for simplicity, setpoint volume as preset variable (injection quantity parameter) for a fuel quantity of the first injection) and in a manner dependent on the injection interval, an individual-accumulator pressure at the start of the second, subsequent injection is then obtained. It is possible for a measured or preferably determined individual-accumulator pressure, in particular a mathematically determined individual-accumulator pressure, at the start of the second injection to be used in order to read out a start of energization and/or an energization duration for at least one characteristic map, preferably from a corrective characteristic map, preferably from an associated first and second characteristic map; in other words, in the case of a second, subsequent injection, it can be assumed that the individual-accumulator pressure need not necessarily correspond approximately to the rail pressure.

In the context of the variant, it is preferably provided that, for a first situation, in which the first injection quantity lies above an injection quantity threshold value and/or the injection interval lies below an injection interval threshold value, the individual accumulator pressure rather than the common-rail pressure is predefined for the determination of the injection quantities of the fuel for the second, subsequent injection. In short, the abovementioned first case of the variant assumes that, if the quantity of the preceding injection is so great, and/or the injection interval to the subsequent injection is so short, that the pressure of the individual accumulator can no longer be regarded as being similar or corresponding to the system pressure, the first case is suitable for performing, in the injection control or regulation unit or engine control or regulation unit, a pressure correction which influences the subsequent injection such that the correct injection quantity of fuel is introduced into the cylinder. It is then important for this that the individual-accumulator pressure rather than the common-rail pressure is predefined for the determination of the quantity of the fuel for the second, subsequent injection.

In a second case of the refining variant, it is provided that, if the first injection quantity lies below an injection quantity threshold value and/or the injection interval lies above an injection interval threshold value, the common-rail pressure rather than the individual-accumulator pressure is predefined for the determination of the injection quantity of the fuel for the second, subsequent injection. In short, this second case is based on the consideration that, if the quantity of the preceding injection is so small, and/or the injection interval to the following injection is so long, that the individual-accumulator pressure can rise practically to the system pressure again, in particular has risen to the common-rail pressure; for the second case, it is then possible for the subsequent injection to take place without pressure correction, that is to say substantially assuming the common-rail pressure.

These stipulations and further circumstances discussed in detail in the drawing have proven to be usable criteria for the application of corrective characteristic maps. In particular in FIG. 8 to FIG. 10 of the drawing, with regard to the control and/or regulation steps D2, B2, a corrective characteristic map is proposed which can be utilized as an option in relation to a standard characteristic map. In particular, an incorporation of a correction, preferably by way of a corrective characteristic map, may take place under the condition that the individual-accumulator pressure deviates significantly from the common-rail pressure; that is to say for example the threshold value of a difference between an individual-accumulator pressure and a common-rail pressure is overshot for the second injection. In that case, a determination of the injection quantity parameter of the fuel for the second, subsequent injection taking into consideration the individual-accumulator pressure has proven to be particularly advantageous; in particular with correction of a STANDARD injection quantity parameter of the fuel for the second, subsequent injection from a standard characteristic map—taking into consideration a common-rail pressure—by way of a CORRECTION injection quantity parameter from a correction characteristic map—taking into consideration an individual-accumulator pressure—, such that, for the determination of the individual quantity parameter of the fuel for the second, subsequent injection, it is possible as a result for an INDIVIDUAL injection quantity parameter to be specified; in particular individually for each injector or cylinder of the engine. An injection quantity parameter may be an injection quantity itself, an injection duration or an energization duration or a start of said energization; this as a STANDARD value, CORRECTIVE value or INDIVIDUAL value.

In the context of a particularly preferred refinement, it is provided that an above-described pressure correction, in particular the selective incorporation of an actual individual-accumulator pressure and/or common-rail pressure for the determination of the injection-quantity parameter for the second, subsequent injection, is implemented in the context of a characteristic-map manipulation. It is preferable, for this purpose, for a learning characteristic map, in particular an abovementioned corrective characteristic map, and a control characteristic map, in particular an abovementioned standard characteristic map, to be provided. The learning characteristic map is preferably in the form of an injector-specific learning characteristic map, and/or the control characteristic map is preferably configured for a SETPOINT injector. A suitable SETPOINT injector is substantially a standard injector or the like as an injector provided as a standard measure; his may for example be an injector with its characteristics in the installed state at the start of the injector service life. An individual injector described by the learning characteristic map may have characteristics that deviate from a SETPOINT injector, said characteristics arising owing to the age or installation location or other causes. The refinement preferably provides that the injection quantity parameter is in particular the injection quantity, or that of a SETPOINT injector, which is corrected by a value which is selectively obtained taking into consideration the individual accumulator pressure and/or the common rail pressure for the second injection.

A standard injector may also be an injector with reference values, obtained for example by mean-value formation or other averaging or characteristic map determination.

It is particularly preferably possible for the individual-accumulator pressure to be recorded in a learning characteristic map which is generated from an appraisal algorithm. The appraisal algorithm preferably generates an output value which is input into the learning characteristic map via a weighting and/or evaluation process. This has the effect that a characteristic map can vary with progressive operating duration of the injector, and in particular is appropriate to the service life of the injector, or is at any rate improved. Statistical fluctuations or similar effects may be averaged out already in the learning characteristic map.

It is particularly preferable for the individual-accumulator pressure to be, in particular, recorded in a learning characteristic map which is based on a control algorithm, wherein the control algorithm generates an output value which is input into a control characteristic map. In other words, the refinement provides that the learning characteristic map is used not directly, that is to say in particular not in real time, for the control of an engine or injection system, but rather is subject to a control algorithm based on a control characteristic map. For the transfer of values from the learning characteristic map into the control characteristic map, it is possible for use to be made of a suitably consolidated control algorithm which ensures that only adequately reliably learned values are used for the actual control of the engine and of the injection system; for example, a transfer of values from a learning characteristic map into a control characteristic map may be performed after one or more working cycles.

It is preferably possible, in the context of a particular embodiment of the preferred refinements, for a learning methodology with an individual-accumulator pressure sensor arrangement to be provided—as is described by way of example in detail on the basis of the drawing.

It is preferably possible—preferably also with an individual-accumulator pressure sensor arrangement—for a first and/or second injection to be performed in controlled fashion, preferably as described above. Subsequently, a control unit can appraise the variables of start of injection and/or end of injection for the individual injection pulses of the first and second injections. The appraised data may be merged in an injector-specific corrective characteristic map. It is basically also possible for a measured value for "individual accumulator pressure at the start of the injection" to be used in the learning process. It is however preferable for the learning process to be adapted to the controlled operation; this can make the storage of the learned values and/or the retrieval of the preset values for controlled operation consistent.

Exemplary embodiments of the invention will now be described below on the basis of the drawing and by way of comparison with the prior art, which is partially likewise illustrated.

Further details of the invention will emerge from the following description of the preferred exemplary embodiments and on the basis of the drawing, in which:

DETAILED DESCRIPTION OF THE INVENTION

Figure 1:
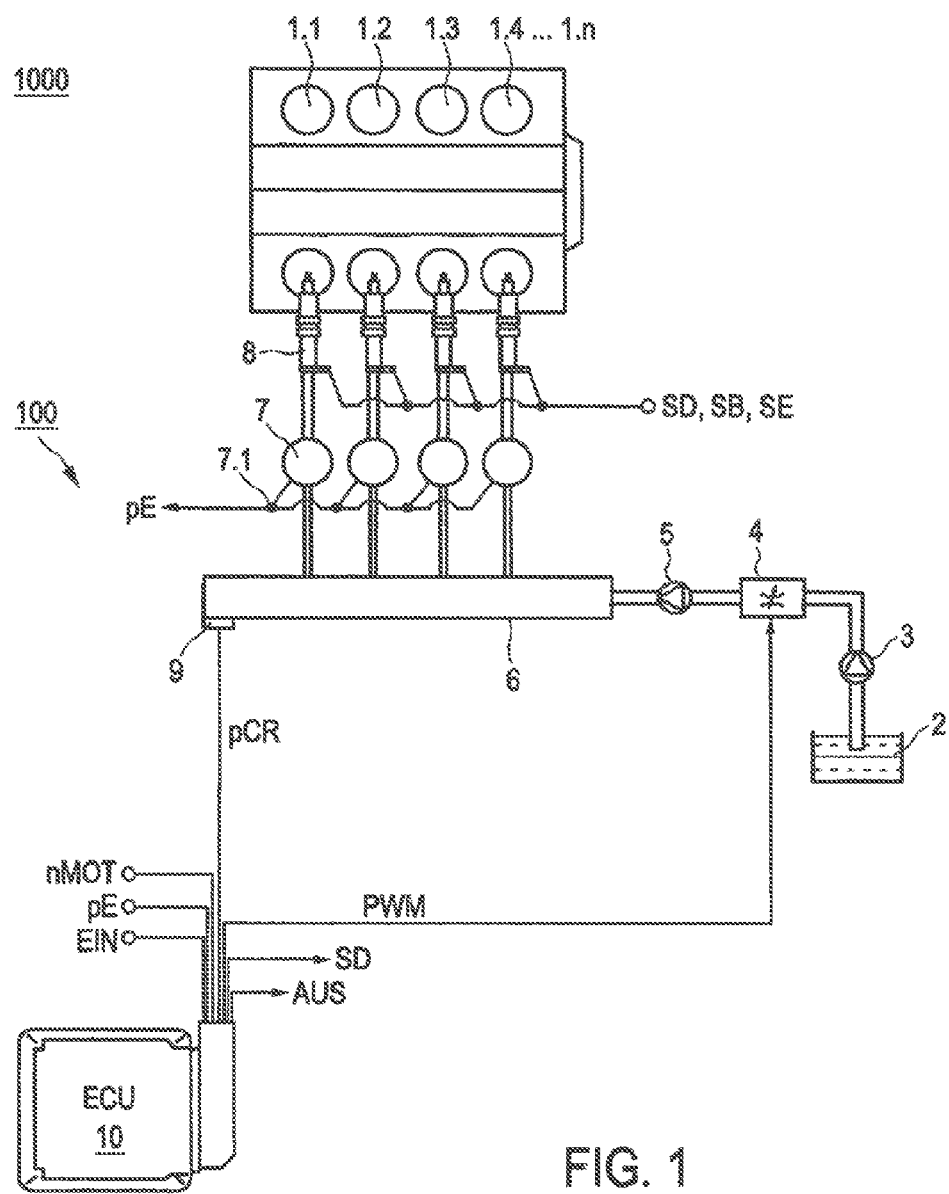
FIG. 1 shows a system diagram of an internal combustion engine with common rail, injector and individual accumulators of an injection system of known type, for illustrating the mode of operation.

FIG. 1 shows a system diagram of an electronically regulated internal combustion engine 1000, in which the illustrated motor 1 has fuel injected into it by way of an injection system 100 with a common rail 6, an individual accumulator 7 and an injector 8. In detail, therefore, the injection system 100 comprises pumps 3 with a suction throttle 4 for the delivery of the fuel from a fuel tank 2 to the common rail 6, a number of individual accumulators 8 and injectors 7 for the injection of the fuel into the combustion chambers 1.1, 1.2, 1.3, 1.4 . . . 1.$n$ (n=8, 12, 16, 20, 24 or similar number). The combustion chambers 1.$n$ will hereinafter also be referred to, for simplicity, as cylinders. In the case of this injection system 100, the hydraulic resistance of the individual accumulator 8 and of the feed lines is correspondingly adapted. The common rail 6 may be in the form of a relatively large accumulator volume or merely as a simple, correspondingly highly pressurized line.

Figure 5:
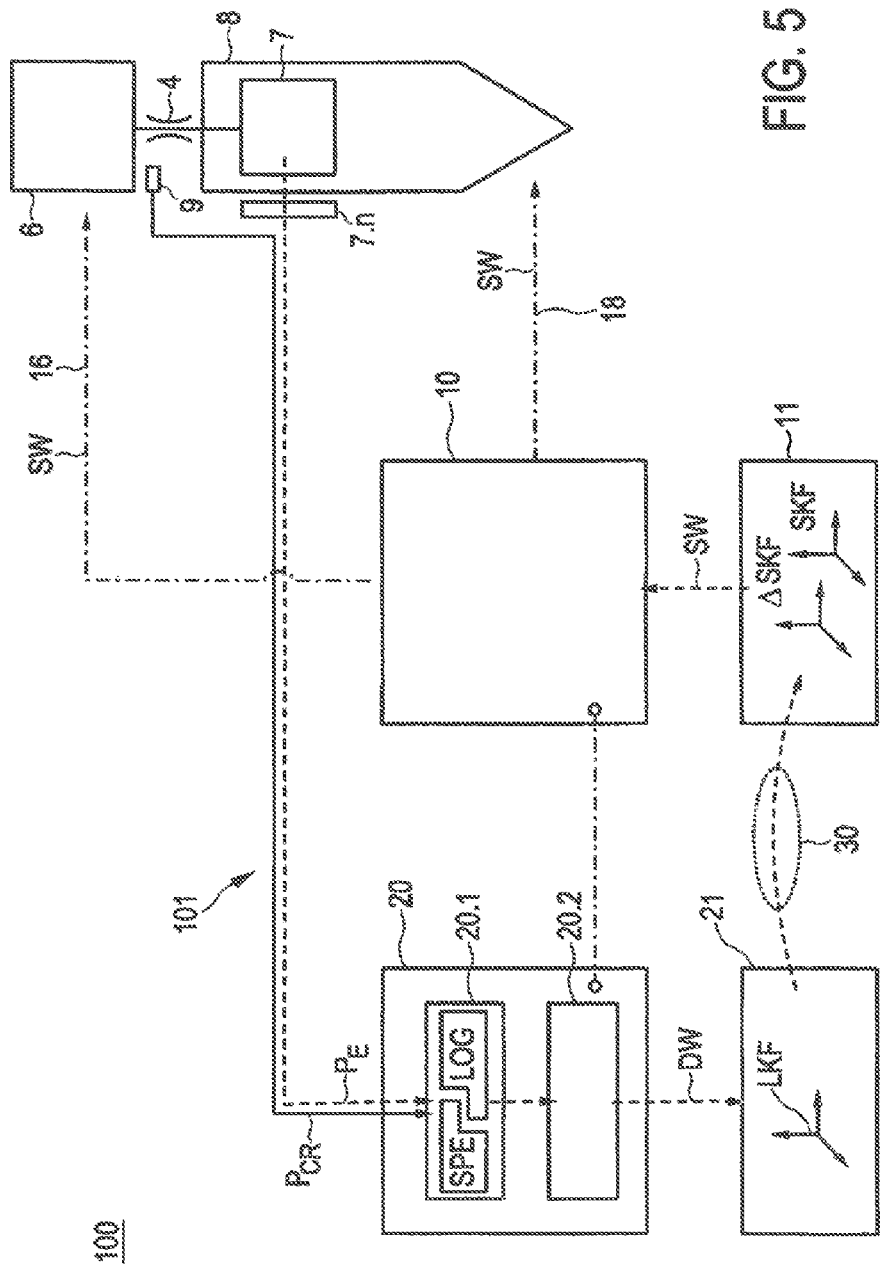
FIG. 5 shows a regulation and control diagram of an injection system having a motor regulator and having an injection processor module and suitable characteristic maps for improved quantity regulation of a desired fuel quantity during a multiple injection, in particular correction of regulation parameters for the setting of an injection quantity of a subsequent injection.

The mode of operation of the internal combustion engine 1000 is regulated by way of an electronic control unit (ECU) 10, wherein refining control and regulation of the injection system 100 is discussed in more detail in the context of FIG. 5 for the purposes of illustrating a particularly preferred embodiment. The electronic control unit comprises constituent parts of a microcomputer system, for example a microprocessor, I/O modules, buffers and memory chips (EE-PROM, RAM or the like). The modules are, for the operation of the internal combustion engine 1000, applied with relevant operating data in the characteristic map/characteristic curves or similar lookup tables. These may be used for example for pilot control.

The electronic control unit 10 calculates from the input variables EIN, which also comprise an individual-accumulative pressure pE, a common rail pressure pCR and an engine speed or torque nMOT, MMOT. Further input variables EIN comprise for example charge-air pressure of a turbocharger and temperatures of coolant and lubricant and of the fuel. A number of output variables AUS also sees a signal for an injection duration SD, if appropriate also start of injection SB and end of injection SE or corresponding signals of an injector energization. Aside from the injection duration SD that is specifically shown, the further output variables AUS of the ECU may also comprise control signals for the control and regulation of the internal combustion engine or of the motor 1, for example a start of injection SB and an end of injection SE. These are suitably converted into energization signals for the injectors 8 in order to realize an injection duration, a start of injection and an end of injection SD, SB, SE. A number of output variables AUS also provides a modulated signal PWM for the control of a throttle 4 between a low-pressure and a high-pressure fuel pump 3, 5. An individual-accumulator pressure pE is detected, if appropriate on an individual-accumulator-specific basis, by way of corresponding pressure sensor arrangements at the individual accumulators 7. A common-rail pressure pCR is detected at the common rail 6 by way of a corresponding pressure sensor. Thus, in the present case, a common-rail pressure sensor 9 for the measurement of the common-rail pressure pCR is shown, as is a suitable pressure sensor arrangement 7.1 . . . 7.$n$ for the measurement of a cylinder-specific individual-accumulator pressure pE(n) at each of the individual accumulators 7.

Figure 2:
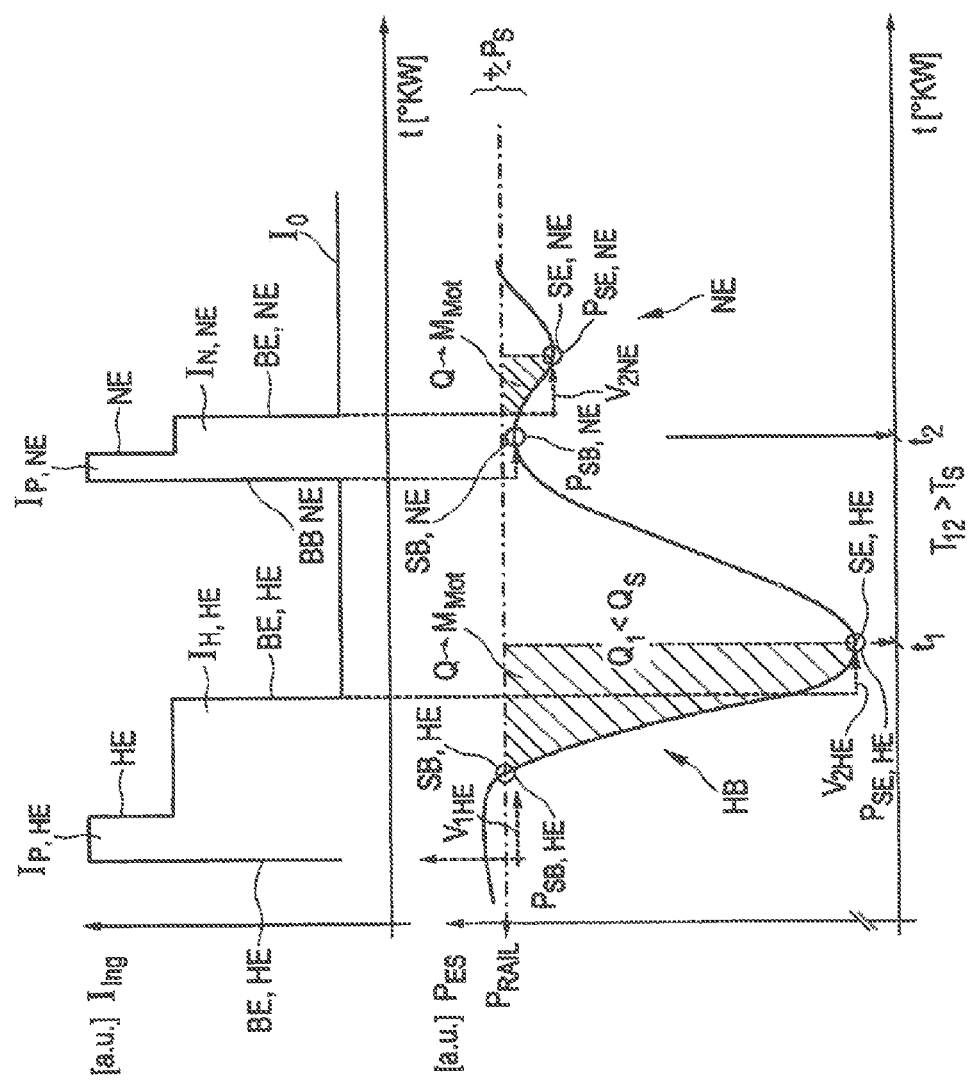
FIG. 2 shows an exemplary profile of an individual-accumulator pressure as a function of an injector energization with relatively small injection quantity $Q_1$ of a preceding injection and relatively long injection interval T12 to the subsequent injection.

FIG. 2 shows, by way of illustration, a profile of an injector current, and an associated profile of an individual-accumulator pressure, for a first configuration of a multiple injection with main injection HE and secondary injection, in this case a post-injection NE. The illustrative diagram thus shows a main injection HE as a preceding injection and a post-injection NE as a subsequent injection. It is basically also possible in the context of the concept for a pre-injection VE (not shown here) to serve as a preceding injection and for a main injection HE to serve as a subsequent injection. It is also possible for the concept of the invention to be applied to a pre-injection VE as a preceding injection and a post-injection NE as a subsequent injection, in this case without taking into consideration a main injection HE. The concept of the invention can also be applied to a multiple injection in which a pre-injection VE serves as a preceding injection, a main injection HE serves as a first subsequent injection, and then the main injection HE serves as a further preceding injection and the post-injection NE serves as a second subsequent injection, in the context of the concept. From this, it is evident that the concept is not restricted to just one single preceding injection and just one single subsequent injection or the direct succession thereof, but rather may be applied in a variable manner, even to multiple injections which have more than two injection processes of a main injection and post-injection, with any desired interval. In particular, the concept can be applied to a multiple injection with more than two injection processes, in particular to all or some of said injection processes, for example to three, four or five etc. or to merely a selection thereof (for example process two of five and/or three of five and/or four of five).

With reference to FIG. 2, the upper diagram shows an injector current for a main injection HE with a rising flank, which marks the start of energization of the main injection BBHE, and with a falling flank, which marks the end of an energization for the main injection BEHE. A corresponding rising flank BBNE marks the start of energization of the secondary injection NE and a corresponding falling flank of the injector current $I_{inj}$ marks the end of energization BENE of the secondary injection NE.

The signal form itself has a peak $I_P$ which lies above the base current $I_0$ and which serves for as fast and thus precise as possible a start actuation of the injector; the injector current $I_{inj}$ thereafter decreases to a holding current $I_H$, which serves for maintaining an actuation of the injector; this in any case for a main injection HE and a secondary injection NE, that is to say, in accordance with the concept of the invention, correspondingly the preceding injection (HE) and subsequent injection (NE).

Taking into consideration an injection delay following a respective one of the flanks BBHE, BEHE, BBNE, BENE, one obtains, in a manner known per se, from the comparison of the injector current $I_{inj}$ with the profile of an individual-accumulator pressure pES in the lower part of FIG. 2 as a function of time in units of crankshaft angle. The individual-accumulator pressure pES is shown in relation to the static system pressure, that is to say in this case the common-rail pressure pRAIL. The injection delay values for start of injection and end of injection V1HE, V2HE and V1NE, V2NE are illustrated by horizontal arrows in FIG. 2 and emerge as an interval of the times for start of energization BB and start of injection SB (V1HE, V1NE) in each case for a start of injection of the main injection SBHE and secondary injection SBNE. The corresponding injection delays at the end of injection emerge from comparison of the end of energization times BE with injection end SE (V2HE, V2NE) in each case for the main injection (SEHE, SENE). The start of injection and end of injection are assigned corresponding pressure values in each case for main injection and secondary injection, specifically pSEHE and pSENE.

Furthermore, in FIG. 2, from a comparison of the time t1 of end of injection of the main injection and of the time t2 of start of injection of the secondary injection—substantially the times assigned to the corresponding pressure extreme values p_SEHE and p_SBNE—an injection interval T12 emerges which is relatively large. Furthermore, there is symbolically plotted in FIG. 2, an injection quantity $Q_1$ for a main injection HE and an injection quantity $Q_2$ for a secondary injection. The sum $Q_1+Q_2=Q$ yields the total quantity as fuel quantity Q to be injected per working cycle of the cylinder. Said total injection quantity $Q=Q_1+Q_2$ is ultimately definitive of an engine torque MMot, which must be taken into consideration for the regulation of an internal combustion engine 1000. As has been identified by the present concept, it is therefore important for the injection quantity, or an injection quantity parameter required for the same, such as for example start of injection SB and/or injection duration SD or the associated values thereof of a start of energization BB and/or energization duration BD, to be specified such that the injection quantities $Q_2$ for a post-injection NE are specifically such that, regardless of how much fuel has been injected with an injection quantity $Q_1$ during a main injection HE, it is nevertheless the desired total injection quantity Q to obtain a desired engine torque MMot that is sought, in particular set as a SETPOINT value; for this purpose, it is necessary for the injection quantity $Q_2$ to be predefined as correctly as possible for a post-injection NE.

FIG. 2 shows a situation in which the injection quantities $Q_1$ of a main injection are relatively small and an injection interval $T_{12}$ is relatively large. This has the result that a pressure of the individual accumulator pSBNE at the start of the post-injection NE may rise to practically the system pressure again, specifically almost the common-rail pressure pRAIL. In the present case, the injection quantity of the main injection $Q_1$ is lower than a threshold injection quantity $Q_S$, and the injection interval $T_{12}$ lies above an injection interval threshold value $T_S$. Consequently, it is generally found that the individual-accumulator pressure pSBNE relevant for a second, subsequent injection lies within a band pRAIL +/−pS around the common-rail pressure pRAIL.

For this situation configuration illustrated in FIG. 2, it has proven to be sufficient to predefine the common-rail pressure pRAIL for the determination of the injection quantity of the fuel for the second, subsequent injection $Q_2$; as a result, this leads to a relatively correct predefined total injection quantity Q of fuel in order to be able to set the engine torque MMot in the best possible manner.

Figure 3:
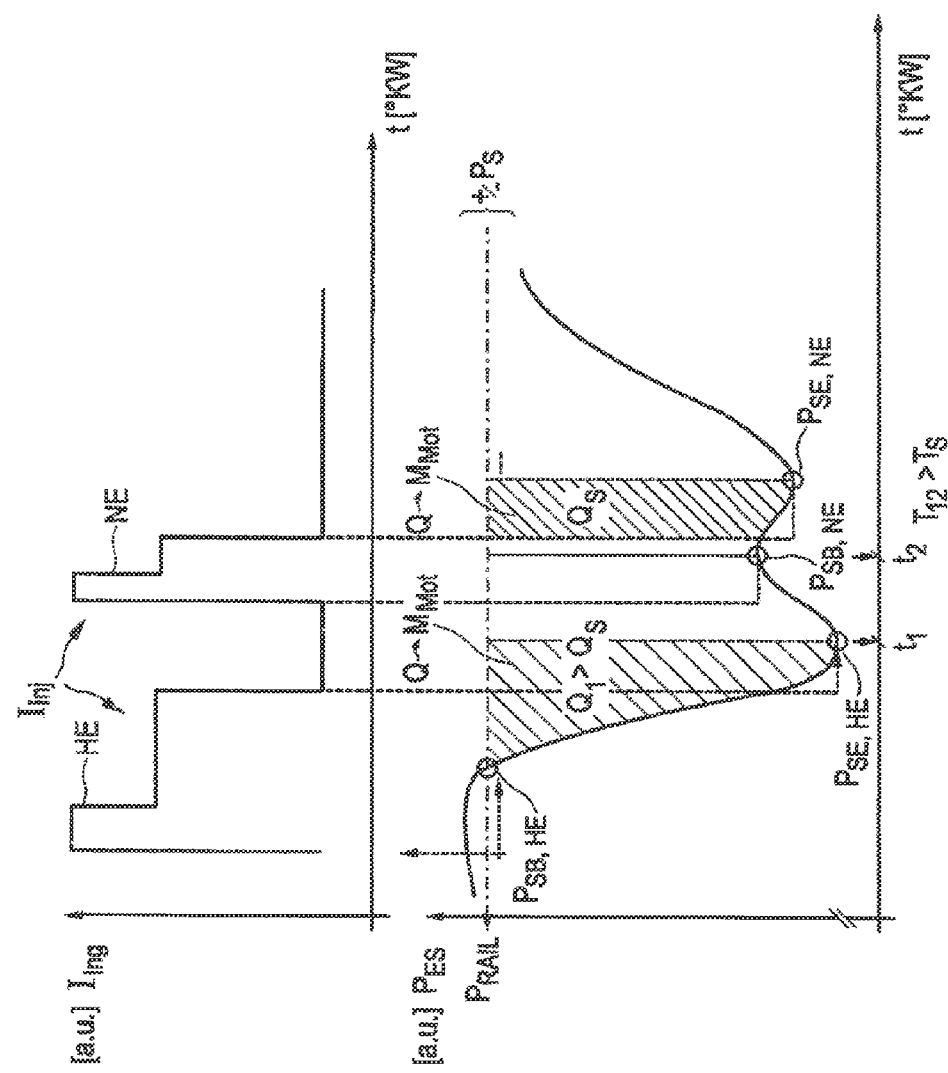
FIG. 3 shows an exemplary profile of an individual-accumulator pressure as a function of an injector energization with relatively large injection quantity $Q_1$ of a preceding injection and relatively short injection interval T12 to the subsequent injection.

FIG. 3 shows an analogous diagram of an injector current $I_{inj}$ and of an individual-accumulator pressure profile pES with reduced labelling for the sake of simplicity. For reasons of clarity, it is also the case that identical reference designations have been used for identical or similar features of the current and pressure profiles and for features of identical or similar function. Below, for illustration of the concept, the differences in the curve profiles in FIG. 2 and FIG. 3 will be discussed. It is essential that a first injection quantity of fuel $Q_1$ during a preceding, main injection lies above a threshold value $Q_S$. Thus, a drop in pressure up until the end of injection of the main injection pSEHE is greater than the corresponding drop in pressure in FIG. 2. Furthermore, an injection interval $T_{12}$ is very much shorter, and is in particular below an injection interval threshold value $T_S$, such that, at the start of the subsequent, secondary injection NE, the individual-accumulator pressure pSBNE still lies considerably below the system pressure, in this case the common-rail pressure pRAIL, or has not yet been able to rise to the common-rail pressure again. Accordingly, in the situation configuration illustrated in FIG. 3, in which the first injection quantity lies above an injection quantity threshold value $Q_S$ and the injection interval lies below an injection interval threshold value $T_S$, it is clear that, for the determination of an injection quantity for the second, subsequent injection $Q_2$, it would be incorrect to apply the common-rail pressure pRAIL. Rather, following the concept of the embodiment proposed here, it is necessary, in a corrective manner, for an actual individual-accumulator pressure pSBNE rather than the common-rail pressure pCR to be taken into consideration, specifically for the determination of the injection quantity, or of an injection quantity parameter significant for the same, of the fuel for the second, subsequent injection. Accordingly, $Q_2$, a start of injection SBNE and/or an end of injection SENE and/or an injection duration SDNE for the post-injection NE is determined assuming the actual individual-accumulator pressure pSBNE.

Figure 4:
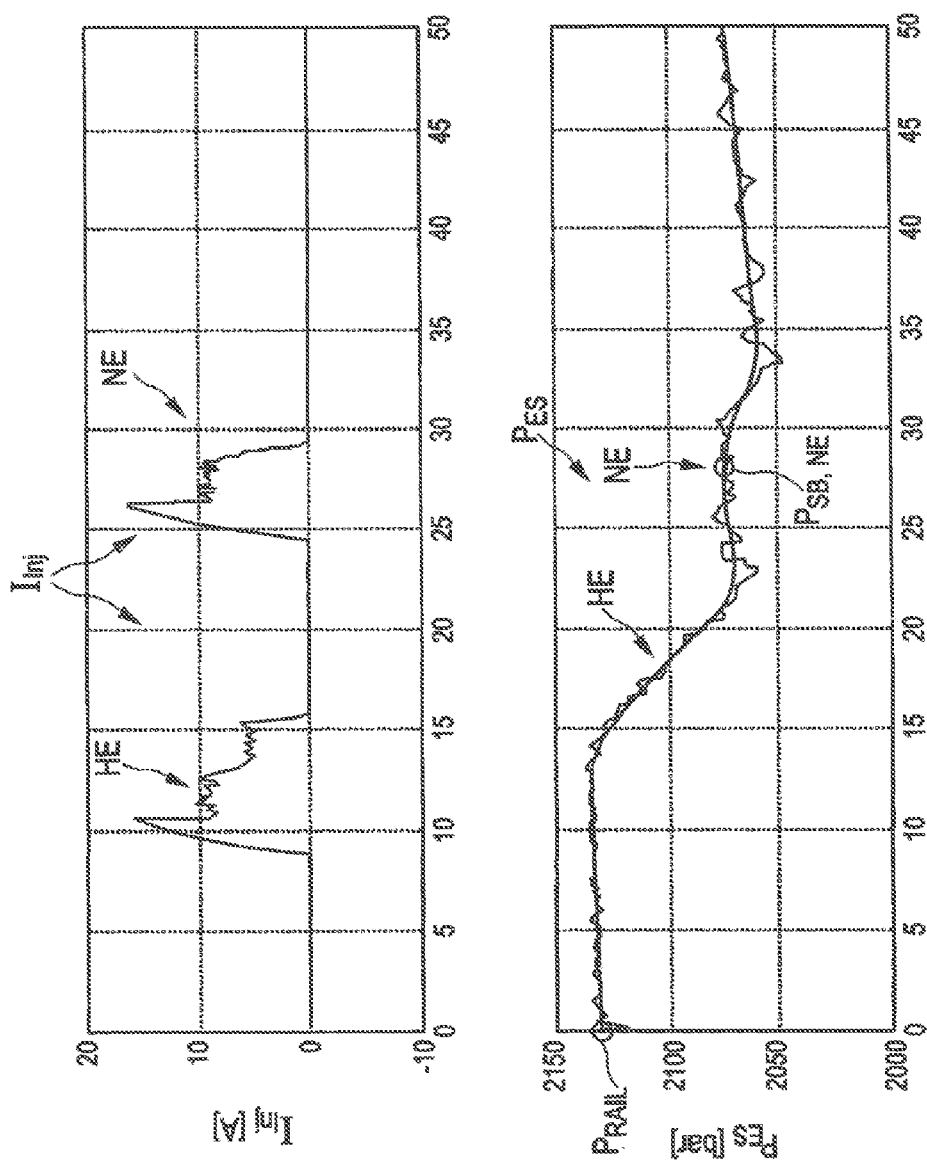
FIG. 4 shows a real injector current and, associated therewith, a real and smoothed individual-accumulator pressure profile pES as a function of a crankshaft angle, in principle as is schematically illustrated in FIG. 3.

FIG. 4 shows an exemplary real profile of an injector current $I_{inj}$ or of an individual-accumulator pressure pES, real and smoothed, for a multiple injection with main injection HE and secondary injection NE. In the present case of FIG. 4, the injector current and the individual-accumulator pressure pES run as per the situation configuration illustrated in FIG. 3, that is to say the individual-accumulator pressure pSBNE lies considerably below the system pressure, in this case the common-rail pressure pRAIL, and is therefore to be taken into consideration for the determination of the injection quantity of fuel for the second, subsequent injection.

FIG. 5 shows an organization diagram of a device 101 for the control and/or regulation of an internal combustion engine 1000, wherein the device 101 is illustrated in more detail with a series of functional modules. The device is part of an injection system 100 having a common rail 6, injector 8 and individual accumulator 7 and associated pressure sensor arrangement 7.n and 9 for the determination of individual-accumulator pressure pE and common-rail pressure pCR, analogously to the approach illustrated in FIG. 1.

The device 101 for control and/or regulation furthermore has a motor regulator 10, shown in FIG. 1, and an injection processor module 20. The motor regulator 10 is capable of controlling the injection system 100 by way of control commands 16, 18, that is to say in particular of transmitting control commands 16, 18, which are configured with regard to injection times and pressures, to the common rail 6 and to an injector 8 or to the peripherals and actuating units thereof. The motor regulator 10 is in this case based on a control characteristic map SKF which is stored in a memory chip 11 assigned to the motor regulator 10.

The injection processor module 20 provides data values to a learning characteristic map LKF assigned to the injection processor module 20, which learning characteristic map is stored in a memory chip 21 and can be parameterized during engine operation. The learning characteristic map LKF records the data values DW from the injection processor module 20. Specifically, an appraisal module 20.2, using an appraisal algorithm, outputs data values DW which are input into the learning characteristic map LKF. The output algorithm is configured, by way of suitable weighting and/or evaluation processes—such as are discussed by way of example with reference to the steps D25 and B25 in FIG. 9 and FIG. 10—to check data supplied thereto with regard to plausibility and apply weighting to said data with suitable damping. Since the internal combustion engine 1000 and the motor 100 and injector 8 thereof and other peripherals are subject to slow change—for example as part of an aging process of the injector 8—it is advantageous for a learning process with duly relatively fast change dynamics to be adapted to the rather slower timescale of a hardware variation, and in so doing filter out fluctuations and the like and/or implement a reliability check, such that only statistically established values are recorded in the learning characteristic map LKF.

The module 20.2 for the implementation of the appraisal algorithm in the injection processor module 20 is in turn controlled by a module 20.1, which will hereinafter also be referred to as ESD box, for the detection of injection durations and implementation of a decision algorithm for the determination of a corrective value; for example, in FIG. 9 and FIG. 10, for the implementation of an injector-specific energization duration BD or of a start of energization BB. Module 20.1 may have a memory SPE which transiently records the values pCR and pES. It is likewise possible for the module 20.1 of FIG. 5 to have a logic LOG which calculates time values such as start of injection and end of injection and transmits these to the module 20.2. The decision algorithm is designed to set injection quantity parameters such as for example the injection quantity itself, time parameters such as injection duration SD, start of injection SB, end of injection SB, and/or pressure values such as rail pressure pRAIL, end-of-injection pressures pSE and start-of-injection pressures pSB, in relation to one another. For this purpose, the module 20.1 has a suitable chip of the memory SPE and a suitable chip of the logic LOG.

An alignment of control characteristic map SKF and learning characteristic map LKF between the memory chips 11, 21 may in turn be realized by way of a control algorithm in an alignment module 30. For example, an alignment module 30 may, in the simplest case, have the effect that certain entries in a learning characteristic map LKF are transferred into the control characteristic map SKF when said entries have become established or statistical in the learning characteristic map after a certain period of time.

Figure 6:
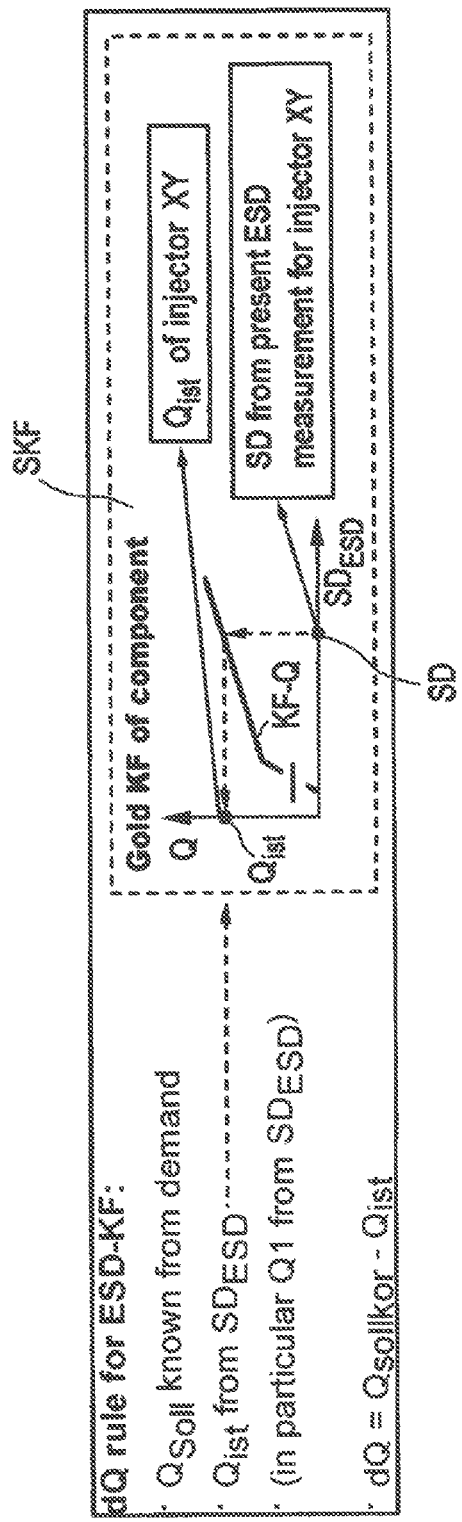
FIG. 6 shows a diagram illustrating an injection quantity determination in the case of a SETPOINT injector by way of a so-called gold characteristic map.

It is also possible for the stated decision algorithm in the module 20.2, or preferably in the alignment module 30, to check whether an injection quantity $Q_1$ lies below an injection quantity threshold value $Q_S$ or above an injection quantity threshold value $Q_S$ and/or to check whether an injection interval $T_{12}$ lies above an injection interval threshold value $T_S$ or below an injection interval threshold value $T_S$, and/or to check whether an individual-accumulator pressure pES lies within a band pRAIL $+/-p_S$ around the rail pressure pRAIL. The decision algorithm is in particular capable of implementing injection quantity requirements as per a systematic arrangement as illustrated in FIG. 6. It is also possible for the start of injection for the secondary injection pSBNE to be determined by extrapolation from the end of injection for a main injection pSBHE by way of a hydraulic model, for example by being calculated by way of a filling and evacuation method for the volume of the individual accumulator 7 in the injector 8. Alternatively, the start-of-injection pressure pSBNE may be measured, or the start-of-injection pressure pSB may be inferred in some other way from the pressure at an end of injection pSE (for example by way of approximated estimation, extrapolation or a calculation, as discussed above, on the basis of a hydraulic model).

Figure 7:
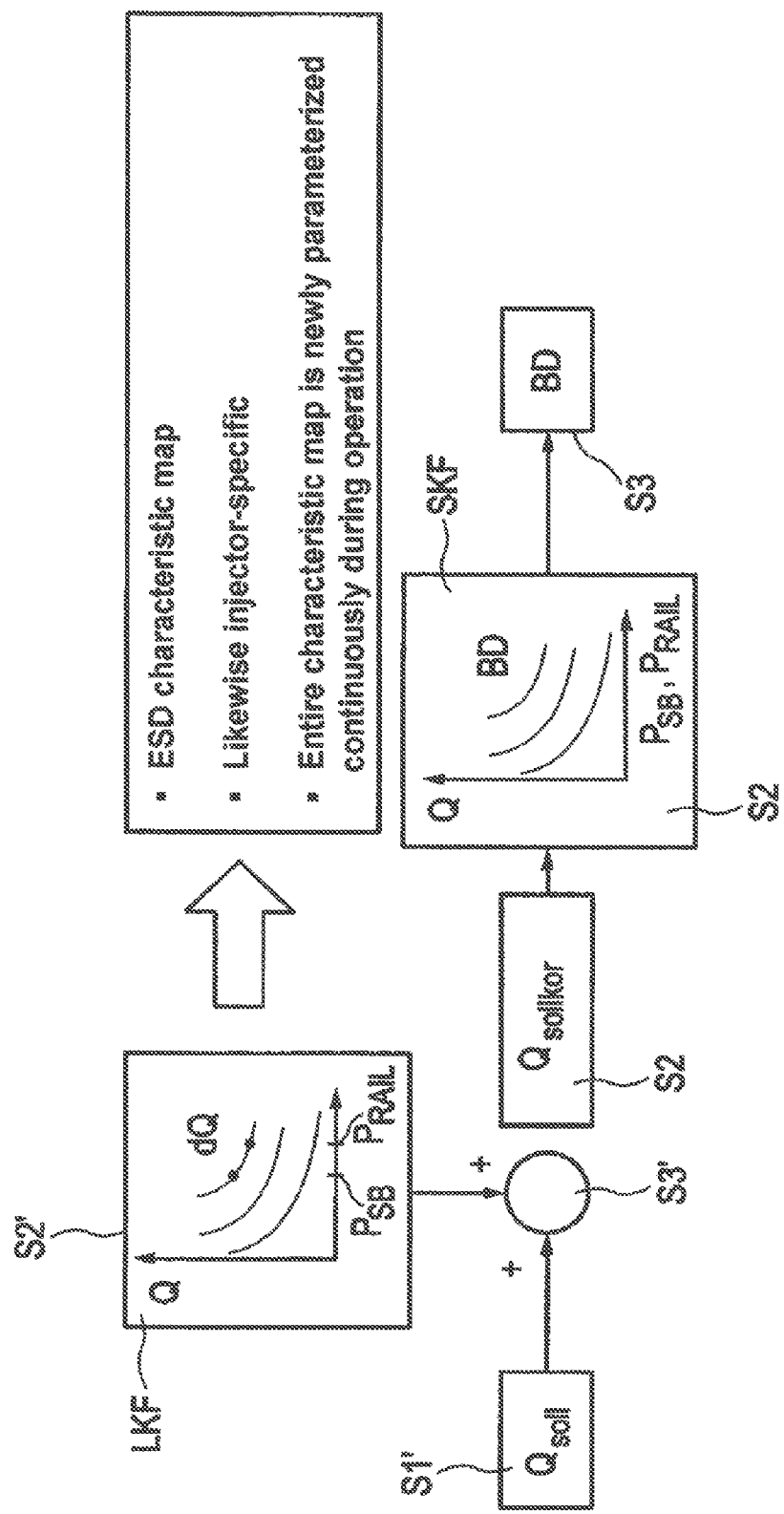
FIG. 7 shows a further diagram, in the context of a first embodiment, for a refining concept for the determination of an injection quantity on the basis of a cylinder-specific characteristic map which is based on a first preferred base regulator structure for the determination of an energization duration for an injector.

An appraisal algorithm of the alignment module 30 is in particular designed to generate data values, to convert these for input into a control characteristic map SKF as shown in FIG. 7, and/or to correct values extracted from a control characteristic map with a corresponding corrective value of the learning characteristic map LKF; a value, corrected in such a manner or in some other way, of an injection quantity parameter can then be applied for the actuation of an injector 8.

Altogether, the configuration of a control and regulation device 101 illustrated in FIG. 5 for an internal combustion engine 1000 can be utilized such that control values SW—if appropriate but not necessarily not in real time—are, after a certain time, for example a number of working cycles or in the case of operating states taking effect, adapted to data values generated by continuous parameterization of the internal combustion engine, that is to say a control characteristic map SKF can be continuously corrected on the basis of a learning characteristic map LKF, in particular for corrected specification of energization duration BD, start of energization BB and/or end of energization BE of an injector for a second, subsequent injection in the context of a multiple injection.

FIG. 6 shows the basic relationship between an actual injection quantity $Q_{ist}$, which emerges directly from an injection duration SD of an injector; the latter in turn emerges inter alia from the injection delays, which can be seen in FIG. 3 and FIG. 4, from the energization times BD, BB, BE. The relationship between $Q_{ist}$ and SD and BD is stored in a standard characteristic map for the corresponding injector—illustrated in this case as a bold line—and is thus available as an assignment rule, in order to directly determine an actual injection quantity $Q_{ist}$ from an injection duration SD plotted on the X axis of the characteristic map; the characteristic map curve KF-Q is correspondingly designated in FIG. 6. The injection duration SD emerges in the present case directly from a pressure measurement at the injector, specifically by way of measurement of an individual-accumulator pressure ESD, from which an end of injection SE and a start of injection SB for an injection process are directly evident, or can be determined for example by way of an algorithm from DE 103 44 181 A1, by way of an interpolation or extrapolation rule of the ESD box.

A SETPOINT injection quantity Q_SOLL emerges inter alia from the torque demands of an engine torque MMot on the internal combustion engine. A changed torque demand generally necessitates a change in injection quantity Q; in the form indicated in FIG. 6 as dQ=Q_SOLL-Q_IST. Correspondingly, the reverse assignment rule as illustrated in FIG. 6 would have to be implemented in order to arrive at a different injection duration SD in order that a changed injection quantity for the operation of the motor 1 is defined. Since the characteristic curve illustrated in FIG. 6 of the standard characteristic map KF-Q is predefined for a particular injection pressure p—specifically common-rail pressure pRAIL or individual-accumulator pressure pES in accordance with the concept of the invention, as illustrated in FIG. 2 to FIG. 4—other values emerge depending on which system pressure is applied as being relevant for the injection process of a post-injection. This applies in particular to a post-injection NE, specifically for the specification of a common-rail pressure pRAIL or individual-accumulator pressure p_SBNE as relevant system pressure for the second, subsequent injection. For example, the standard characteristic map KF-Q (Gold-KF) illustrated in FIG. 6 may be used in order to individually determine a virtual injection quantity Q-IST_virtuell for an injector as per the step D22 in FIG. 9 in order to be able to implement an alignment with an actual injection quantity in order to create a learning characteristic map LKF as per FIG. 9—this utilizing an individual-accumulator pressure pES as input variable. For example, the standard characteristic map KF-Q (Gold-KF) illustrated in FIG. 6 may also be used to determine a virtual injection quantity Q-IST_virtuell for a SETPOINT injector—this utilizing a common-rail pressure pRAIL as input variable.

Below, in particular, the injection duration SD and the energization duration BD are referred to as an injection quantity parameter which can be utilized as substantially equivalent to an injection quantity Q. The concept of the invention can thus be implemented with each of said variables, or variables which determine these, regardless of when, and in what form, or whether, a conversion into an injection quantity Q is performed, because an injection duration SD and an actual injection quantity Q at a particular pressure are uniquely assigned by way of the relationship in FIG. 6.

FIG. 7 shows a detail of a first preferred base regulator structure for the determination of an energization duration and a method for control and/or regulation for an injector (which in turn specifies an injection duration). If, in a base controller, in step S1, a SETPOINT value of an injection quantity is predefined for example on the basis of a SETPOINT engine torque, then from the energization duration standard characteristic map SKF in step S2 at predefined system pressure, in this case the common-rail pressure pRAIL, a particular value of an energization duration BD emerges, for the SETPOINT value of an injection quantity $Q_{SOLL}$, in the third step S3. As a result, this directly yields a certain injection duration, such that—at any rate in the case of a standard or SETPOINT injector—it can initially be assumed that the demanded $Q_{SOLL}$ is also actually supplied to the cylinder chamber; this thus applies initially to a SETPOINT injector because, in this case, the common-rail pressure pRAIL has been assumed as system pressure.

Figure 8:
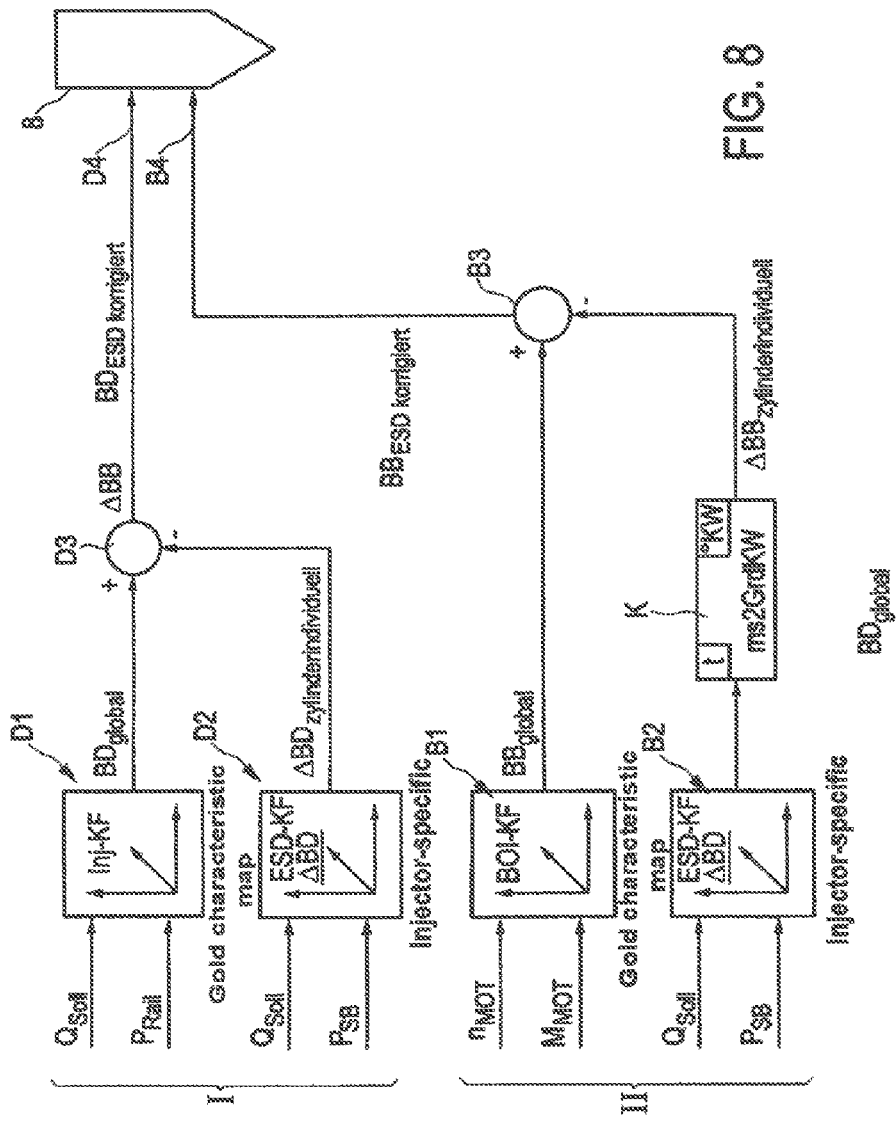
FIG. 8 shows a further diagram, in the context of a second embodiment, for a more specific refining concept, with determination of standard values and corrective values (global and individual) values for energization duration BD and start of energization BB for an injector which is based on a second preferred base regulator structure for an injector.

In an enhancement of said base regulator structure, the refining regulator structure of FIG. 7 furthermore provides that the SETPOINT value of an injection quantity $Q_{SOLL}$ must be corrected, in an upstream further first step S1', to a corrected injection quantity $Q_{SOLLkor}$ for the abovementioned first step S1 (this applies analogously to an injection duration SD-SOLL in the upstream further first step S1' and/or a corrected injection duration $SD_{SOLLkorr}$ in the abovementioned first step S1). Said correction is obtained on the basis of a learning characteristic map which provides an injection quantity correction dQ in a manner dependent on a specified relevant system pressure at the time of the injection, specifically in particular the time of a post-injection NE; since said correction relates to an individual injector, the individual-accumulator pressure pES must basically be applied here. A learning characteristic map LKF of said type may be predefined on an injector-specific basis and may in particular be continuously newly parameterized during operation on the basis of the actual, for example measured or mathematically determined (virtual) individual-accumulator pressures pES, optionally instead of a common-rail pressure pCR. The learning characteristic map LKF illustrated in step S2' specifies an injection quantity change on an injector-specific basis for a particular pressure at start of injection pES_SB; that is to say in the case of an individual-accumulator pressure instead of the common-rail pressure. A corresponding injection quantity change is to be corrected in step S3'—analogously to the third steps D3, B3 for the determination of the corrected values as depicted in FIG. 8—to the SETPOINT injection quantity $Q_{SOLLkor}$, and is then input in the first step S1 as $Q_{SOLLkor}$ into the energization duration determination in step S2. In this respect, the step sequence D2 discussed below on the basis of FIG. 8 can be regarded as analogous to the step S2', and the step sequence D1 discussed below on the basis of FIG. 8 can be regarded as being analogous to the step S1'. In the step S3 of FIG. 7, a corrected energization duration BD for the actuation of the injector 8 is output; this is analogous to the step sequence D4 of FIG. 8.

FIG. 8 now shows a second preferred base regulator structure and a method for control and/or regulation for an injector, specifically for the energization of the injector 8; in this case, in part I, for the specification of an energization duration BD and, in part II, for the specification of a start of energization BB, in both cases corrected with specification of a relevant system pressure with an individual-accumulator pressure measurement ESD, that is to say optionally an individual-accumulator pressure pES or common-rail pressure pCR.

The regulator structure provides, in the first part I, a standard characteristic map Inj-KF which, input variables of a SETPOINT injection quantity $Q_{SOLL}$ at predefined system pressure pRAIL—ultimately by definition of a SETPOINT injector—, initially outputs a "global" standard value of an energization duration $BD_{global}$, which in this respect is basically a good first assumption for all injectors 8 of the motor 1. It has been found that said value should be corrected, in particular on an injector-specific basis, by way of a cylinder-specific energization duration $\Delta BD_{zylinderindividuell}$. For this purpose, furthermore, a characteristic map ESD-KF-ΔBD relevant for the individual-accumulator pressure is predefined, which characteristic map, with input of a SETPOINT injection quantity $Q_{SOLL}$ and of an individual-accumulator pressure pES at the start of injection, that is to say $p_{SB}$, outputs a corrected energization duration ΔBD individually for each of the injectors used. This applies in particular to the start of injection SB of a subsequent injection, that is to say of a secondary injection, in this case the post-injection assuming the associated individual-accumulator pressure pSBNE. For a particular injector, it is thus possible for the global value of an energization duration $BD_{global}$ (determined by way of the general system pressure of a common rail pRAIL) to be corrected in a cylinder-specific manner on the basis of the stipulation of the pressure, which is actually relevant for the injection, in the individual accumulator (determined by way of optionally the general system pressure of a common rail pRAIL and/or the individual-accumulator pressure pES). In step D1 of the regulator structure part I of FIG. 8, it is thus possible for an initially general energization duration value $BD_{global}$ to be specified on the basis of a system pressure $p_{Rail}$, which is corrected by way of a cylinder-specific energization value $\Delta BD_{zylinderindividuall}$ determined in step D2. In step D3 of the regulator structure part I in FIG. 8, a corrected energization duration value $BD_{ESDkorrigiert}$ can thus be specified and transmitted as a control value to the injector 8 in step D4.

Figure 9:
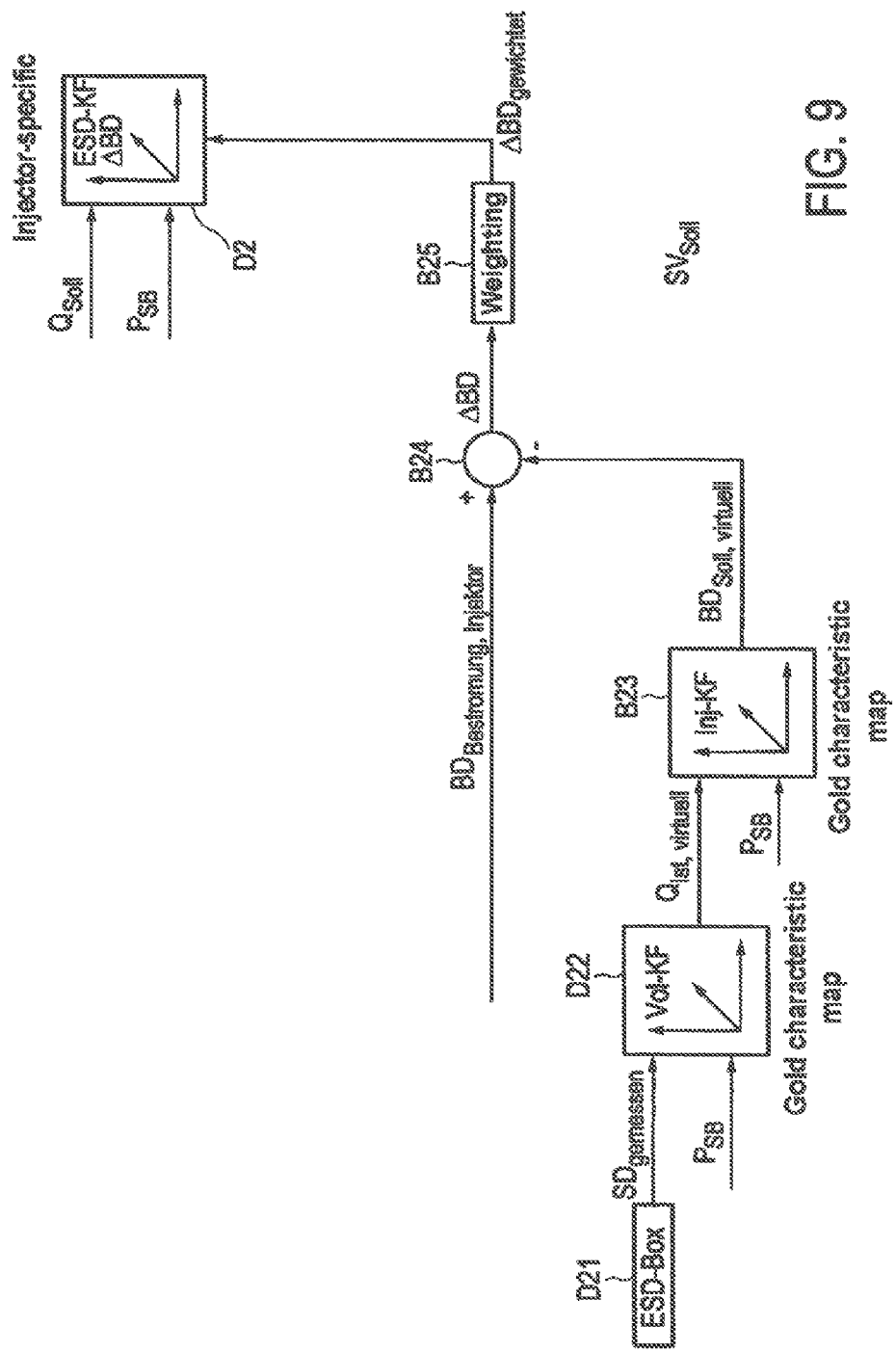
FIG. 9 shows a diagram illustrating a learning function for an injector-specific energization duration and for the formation of a learning characteristic map for the injector-specific energization duration.

Referring initially to FIG. 9, it will be discussed how the injector-specific learning characteristic map ESD-KF-ΔBD (LKF) for the implementation of step D2 in part I of FIG. 8 can be created. For this purpose, in a sensor arrangement and appraisal module—in this case ESD box approximately analogous to the module 20.1 in FIG. 5—, an injection duration $SD_{gemessen}$ is firstly determined by way of an individual-accumulator pressure measurement, for example by measurement of an end of injection and a mathematical determination of a virtual start of injection in step D21. The further steps D22 to D25 may be implemented in an appraisal module 20.2 shown in FIG. 5. In step D22, it is then possible, on the basis of an individual-accumulator pressure pES at the start of injection, that is to say $p_{SB}$, and the measured injection duration $SD_{gemessen}$, and on the basis of a characteristic map Vol-KF for the injection quantity in step D22, to determine in any case a virtual ACTUAL injection quantity $Q_{IST,virtuell}$. Then, in step D23, with the aid of an injector characteristic map Inj-KF, in turn utilizing the individual-accumulator pressure pSB at start of injection, a virtual energization duration $BD_{SOLL,virtuell}$ as SETPOINT value is determined. The virtual SETPOINT value of an energization duration $BD_{SOLL,virtuell}$ thus emerges overall from the measured injection duration $SD_{gemessen}$ and the actually prevailing pressure of an individual accumulator at start of injection $p_{SB}$.

Said virtual SETPOINT value of an energization duration $BD_{SOLL,virtuell}$ can be aligned with the actual energization duration $BD_{Bestromung,Injektor}$ in step D24, and initially yields an unprocessed difference value of an error deviation ΔBD. From this, following a weighting process in step D25, an error deviation $ΔBD_{gewichtet}$ for the energization duration can be obtained. The deviation for the energization duration emerges as a result from an alignment between actually measured energization $BD_{Bestromung,Injektor}$ and actual injection duration $SD_{gemessen}$.

The error checking and weighting in step D25 is performed with relatively high damping or low weight value, because motor drift is assumed as being fundamentally slow in relation to any fluctuations in the error values ΔBD, after step D24. The weighting performed in step D25 may serve as part of an appraisal algorithm which may furthermore implement an evaluation process in order to create a relatively reliable learning characteristic map ESD-KF-ΔBD and simultaneously develop this with correspondingly high damping. The learning characteristic map in step D2 need not imperatively be implemented in real time, but rather may for example be used in delayed fashion in a subsequent working cycle, entirely or partially for the correction of a standard characteristic map Inj-KF of step D1 in FIG. 8.

As a result, a relationship then exists between the energization duration deviations ΔBD for an ideal injection quantity $Q_{SOLL}$ at a particular individual-accumulator pressure pSB for start of injection—in particular of the secondary injection NE, that is to say at a particular individual-accumulator pressure pSBNE. This may be utilized in step D2 for the determination of the above-discussed cylinder-specific or injector-specific energization duration deviation $ΔBD_{zylinderindividuell}$. Here, it is relevant that the individual-accumulator pressure $p_{SB}$ at the start of a post-injection is actually used. For example, it may be necessary for an energization duration deviation of approximately ½° crankshaft angle in the case of a present individual-accumulator pressure pES of approximately 1900 bar to be recorded in the learning characteristic map ESD-KF-ΔBD. An assumption of such a deviation at rail pressure pRAIL would lead to the wrong correction characteristic for the injector. This is because, at a different individual-accumulator pressure, the injector should where possible be corrected with a different crankshaft degree. The explanations given here with regard to FIG. 9 and FIG. 8 regarding a post-injection NE in relation to a main injection HE are not restricted to such a sequence of secondary injection and main injection HD, and in particular apply analogously with regard to a main injection HD in relation to a pre-injection VE.

FIG. 8 shows, in part II, the regulator structure regarding how a start of injection $BD_{global}$ is determined in a step B1 from a standard characteristic map BOI-KF with predefinition of an engine speed nMOT and of an engine torque MMot, in turn ultimately with definition of a standard injector, which in this case is also referred to as SETPOINT injector. In a second step B2, a cylinder-specific deviation therefrom can be specified as $ΔBD_{zylinderindividuell}$ from a learning characteristic map ESD-KF-ΔBD (LKF) with pre-definition of a SETPOINT injection quantity $Q_{SOLL}$ and of an actually prevailing individual-accumulator pressure pSB. Whereas the learning characteristic map LKF initially provides a time t for the start of injection deviation, this can be converted in a step k to a crankshaft angle ° KW.

In a step D3, the start of injection $BB_{global}$ (BOI—"Begin of Injection") can be corrected to a value $BD_{ESD,korrigiert}$, which determines either an earlier time or a later time as start of energization as $BB_{global}$. If the start of energization $BB_{ESDkorrigiert}$ precedes the standard start of energization $BB_{global}$, this can lead as a result to a longer injection duration SD. If the start of energization $BD_{ESDkorrigiert}$ follows the standard start of energization $BD_{global}$, this can lead, with restriction, to a short injection duration SD. The corrected start of energization $BB_{ESDkorrigiert}$ is transmitted in step D4 to the injector 8.

Figure 10:
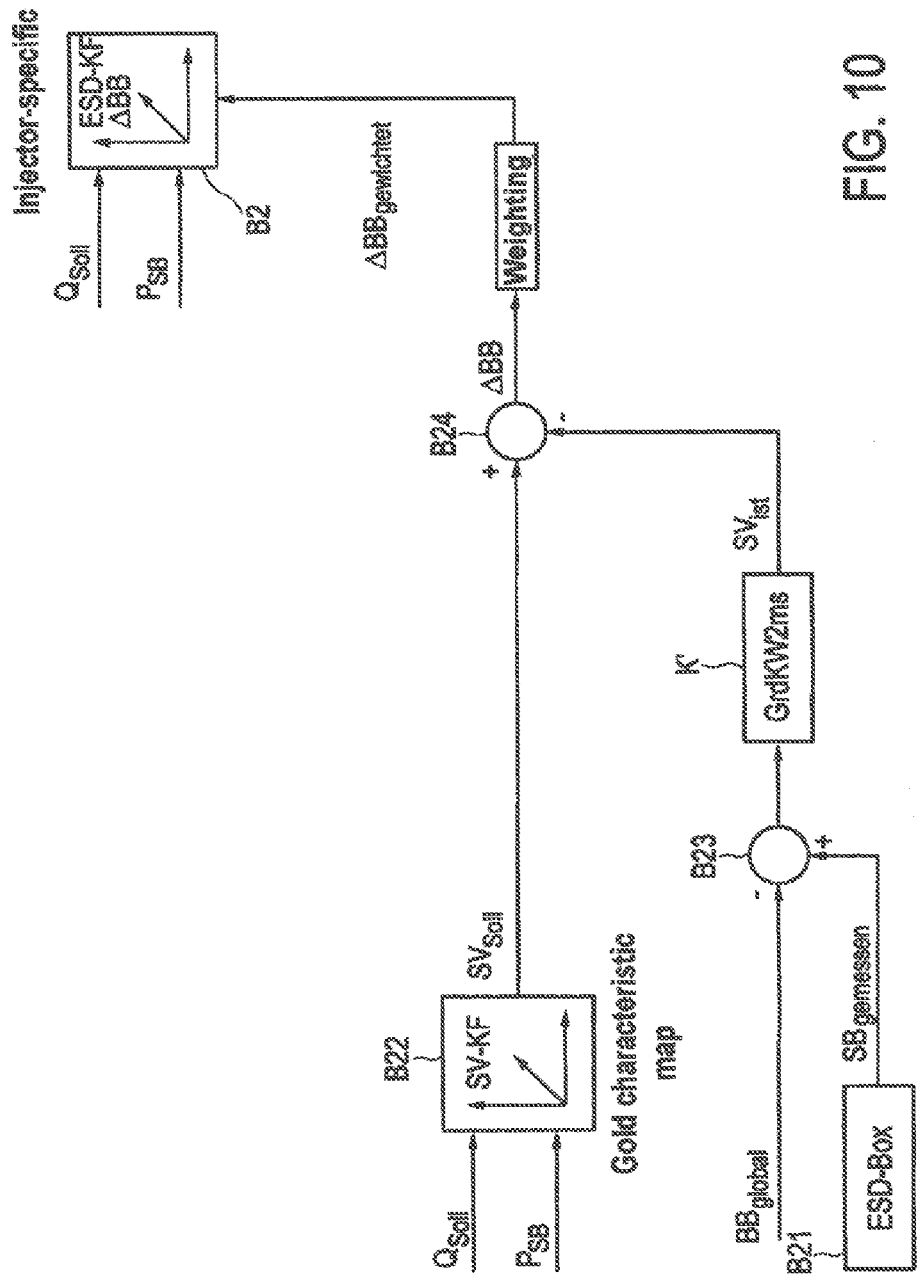
FIG. 10 shows an analogous diagram for illustrating a learning function for an injector-specific start of energization or for illustrating a learning characteristic map of an injector-specific start of energization.

Furthermore, FIG. 10 shows, in this regard, the regulation diagram for the creation of a characteristic map ESD-KF-ΔBD for the step D2 of FIG. 8. Firstly, a standard characteristic map SV-KF for the determination of an injection delay $SV_{SOLL}$ is predefined, that is to say a particular injection delay is determined in step B22 with inputting of a determined individual-accumulator pressure at start of injection pSB and of a SETPOINT value of an injection quantity; for example of a total injection quantity Q or of an injection quantity $Q_2$ for the post-injection NE. In the step B21, a standard start of injection $BB_{global}$ is taken as a starting point, which is aligned in step B23 with a start of injection $SB_{gemessen}$, determined in the ESD box in step B21, based on a measurement. The deviation is converted by way of a conversion module k' to an actual injection delay $SV_{IST}$, and in step B24, is aligned with the above-discussed standard of an injection delay $SV_{SOLL}$. A resulting difference value ΔBD is supplied to a weighting module B25, and a weighted value for a start of injection $ΔBD_{gewichtet}$ is determined. The weighting module B25 furthermore has a functionality for checking and damping the difference values ΔBD for the injection delay in order to adapt variations, fluctuations and outliers to a slow engine drift. As a result, with ongoing parameterization, the learning characteristic map ESD-KF-ΔBD is filled in accordance with a slow change of the motor 1 and/or of the injector 8 and can be supplied to the control characteristic map SKF, as discussed in FIG. 8 in step B3, for correction, or adopted entirely by said control characteristic map, if not instantaneously then in the next working cycle or in one of the next working cycles or even thereafter on a much longer timescale. The explanations given here regarding FIG. 10 and FIG. 8 regarding a post-injection NE in relation to a main injection HE are not restricted to such a sequence of secondary injection and main injection HE, and in particular apply analogously with regard to a main injection HE in relation to a pre-injection VE.

A learning mode and a control mode, that is to say utilization of a learning characteristic map LKF in the memory 21 to form a control characteristic map SKF in the memory 11, may be optional, that is to say the steps D3 and B3 may optionally be carried out with or without regard to the values obtained in steps D2 and B2, and if appropriate, the deviation values $\Delta BD_{zylinderindividuell}$ or $\Delta BB_{zylinderindividuell}$ may be set to zero. Also, said values may for example be applied with a time delay for one or more cycles of the motor 1, such that a correction is duly substantially updated but not with immediate effect.

The module 20.1 of FIG. 5 is, with regard to FIG. 9 and FIG. 10, also referred to as ESD box of steps D21 and B21, and is thus responsible for the provisional storage of a pressure profile pES at the individual accumulator 7 and of a chronological sequence, determined therefrom by way of logic chip LOG, of start of injection and end of injection and injection duration. The further regulator structure may be provided in the appraisal module 20.2 of FIG. 5, wherein use is made of learning characteristic maps LKF with non-weighted values as per steps D24 and B24—in this case the deviation values $\Delta BD$ and $\Delta BB$. The weighting modules D25 and B25 may, in a modification, be assigned to the weighting and/or evaluation process 30. As a control characteristic map SKF, it is then the case that a combination of standard characteristic map (Gold characteristic map) and injector-specific characteristic map ($\Delta SKF$) is input into the motor controller 10.

The invention claimed is:

1. A method for operating an internal combustion engine having a motor with a number of cylinders and an injection system having a common rail and a number of injectors assigned to the cylinders, wherein an injector is assigned an individual accumulator that holds fuel from the common rail available for the injector, wherein the method comprises the steps of:
   injecting fuel by an injector into a cylinder, wherein a multiple injection is performed during each working cycle of a cylinder, having the steps:
   injecting a first injection quantity of fuel in a first, preceding injection and injecting a second injection quantity of fuel in a second, subsequent injection, and
   determining a fuel pressure for the common rail or the individual accumulator,
   determining an injection quantity parameter for the first, preceding injection;
   determining an individual-accumulator pressure or a common rail pressure for the second, subsequent injection;
   determining an injection quantity parameter for the second, subsequent injection, by selecting and taking into consideration the individual-accumulator pressure and/or the common rail pressure in order to determine the injection quantity parameter for the second, subsequent injection;
   determining an injection interval duration between the first injection and the second injection; and
   determining an individual-accumulator pressure in order to determine the injection quantity parameter for the second, subsequent injection;
   wherein in the event that the injection quantity of the first, preceding injection lies above an injection quantity threshold value or the injection interval duration lies below an injection interval threshold value, the individual-accumulator pressure rather than the common rail pressure is predefined for the determination of the injection quantity of the fuel for the second, subsequent injection, or
   in the event that the first injection quantity lies below an injection quantity threshold value or the injection interval duration lies above an injection interval threshold value the common rail pressure rather than the individual-accumulator pressure is predefined for the determination of the injection quantity of the fuel for the second, subsequent injection.

2. The method as claimed in claim 1, including determining the injection quantity parameter for the first, preceding injection or the second, subsequent injection with adaptation of an energization duration or a start of energization.

3. The method as claimed in claim 2, including carrying out the determination of the injection quantity parameter with formation of at least one characteristic map value in each case of the energization duration or of a start of energization or with specification of a corrective value of a predefined standard value in each case of the energization duration or of a start of energization of the injector.

4. The method as claimed in claim 1, including determining the injection quantity parameter for the second, subsequent injection in a manner dependent on a threshold value formed in order to indicate an adaptation-relevant deviation of the individual-accumulator pressure from the common-rail pressure.

5. The method as claimed in claim 4, wherein the deviation is a difference between an individual-accumulator pressure and a common rail pressure for the second injection.

6. The method as claimed in claim 1, wherein the determination of the individual-accumulator pressure is performed at least in a manner dependent on the injection quantity parameter for the first, preceding injection and on the injection interval duration.

7. The method as claimed in claim 1, wherein the injection quantity parameter is an injection quantity itself in the case of the first injection, or the injection quantity parameter comprises an injection duration or a start of injection in the case of the second injection.

8. The method as claimed in claim 7, wherein the injection quantity parameter is a setpoint or an actual value of the injection quantity.

9. The method as claimed in claim 1, wherein the injection interval duration is determined from an injection end of the first, preceding injection and a start of injection of the second, subsequent injection.

10. The method as claimed in claim 1, wherein the individual-accumulator pressure for the second, subsequent injection is determined analytically or by interpolation of a pressure profile of the individual-accumulator pressure from a characteristic map.

11. The method as claimed in claim 1, including forming a learning characteristic map as an injector-specific learning characteristic map, or configuring a control characteristic map for a setpoint injector, wherein the injection quantity is that of a setpoint injector that is corrected by a value obtained by selecting and taking into consideration the individual-accumulator pressure or the common rail pressure for the second, subsequent injection.

12. The method as claimed in claim 11, including recording the individual-accumulator pressure in a learning characteristic map that is generated by an appraisal algorithm, wherein the appraisal algorithm generates an output value that is input into the learning characteristic map via a weighting or evaluation process.

13. The method as claimed in claim 11, including recording the individual-accumulator pressure in a learning characteristic map that is based on a control algorithm, wherein the control algorithm generates an output value that is input into a control characteristic map.

14. A device for controlling or regulating an internal combustion engine, comprising: a motor regulator; and an injection processor module designed for carrying out a method as claimed in claim 1, wherein the motor regulator has a control characteristic map and the injection processor module has a learning characteristic map.

15. An injection system, comprising: a common rail for an internal combustion engine having a motor with a number of cylinders, and a number of injectors assigned to the cylinders, wherein an injector is assigned an individual accumulator designed for holding fuel from the common rail available for injection into the cylinder; and a device according to claim 14 for controlling or regulating the internal combustion engine.

16. An internal combustion engine, comprising: a motor that has a number of cylinders; and an injection system according to claim 15 having a common rail and having a number of injectors.

* * * * *